United States Patent [19]

Frazza et al.

[11] Patent Number: 5,147,937
[45] Date of Patent: Sep. 15, 1992

[54] PROCESS FOR MAKING CONTROLLED, UNIFORM-SIZED PARTICLES IN THE 1 TO 50 MICROMETER RANGE

[75] Inventors: Mark S. Frazza, Philadelphia; Kim S. Ho, Richboro; Alexander Kowalski, Plymouth Meeting; Robert R. Raney, Newtown Square; Martin Vogel, Jenkintown, all of Pa.

[73] Assignee: Rohm and Haas Company, Philadelphia, Pa.

[21] Appl. No.: 662,872

[22] Filed: Mar. 1, 1991

Related U.S. Application Data

[63] Continuation-in-part of Ser. No. 497,377, Mar. 22, 1990, abandoned.

[51] Int. Cl.$^5$ .............................................. C08F 2/20
[52] U.S. Cl. ................................. 525/243; 525/260; 525/265; 525/313; 521/56; 521/59; 521/117; 521/131; 521/142; 521/146; 526/201; 526/209
[58] Field of Search ............... 526/201, 202, 88, 232.1, 526/218.1, 209; 525/242, 243, 260, 265, 313; 428/402; 521/117, 131, 142, 146, 56, 59

[56] References Cited

U.S. PATENT DOCUMENTS

| | | | |
|---|---|---|---|
| 3,792,029 | 2/1974 | Roubinek et al. | 260/88.2 C |
| 3,959,189 | 5/1976 | Kitamori et al. | 260/8.5 B |
| 4,085,169 | 4/1978 | Saito et al. | 526/212 X |
| 4,091,054 | 5/1978 | Saito et al. | 526/201 X |
| 4,186,120 | 1/1980 | Ugelstad | 260/29.6 RB |
| 4,333,969 | 6/1982 | Wright et al. | 526/209 X |
| 4,336,173 | 6/1982 | Ugelstad | 523/205 |
| 4,382,124 | 5/1983 | Meitzner et al. | 521/38 |
| 4,419,245 | 12/1983 | Barrett et al. | 526/201 X |
| 4,459,378 | 7/1984 | Ugelstad | 523/205 |
| 4,518,724 | 5/1985 | Kuwajima et al. | 523/501 |
| 4,530,956 | 7/1985 | Ugelstad et al. | 526/87 X |
| 4,582,859 | 4/1986 | Lein, Jr. et al. | 521/56 |
| 4,935,469 | 6/1990 | Akasaki et al. | 526/202 X |

FOREIGN PATENT DOCUMENTS 0190886 8/1986 European Pat. Off. ............ 526/202

OTHER PUBLICATIONS

Almog et al., "Effect of Initiator on the Molecular Weight Distribution in Dispersion Poly'n of Styrene", J. Polym. Sci. (Chem.) 18, 1 (1980).

Almog et al., "Studies of Particle-Size Distribution . . . of Stabilizers in Dispersion Polymerization", J. Polym Sci. (Chem.) 20, 417 (1982).

Almog et al, "Dispersion Polymerization of Styrene: Effect of Surfactant", J. Polym. Sci. (Chem.) 19, 115 (1981).

Almog et al., "Monodisperse Polymeric Spheres in the Micron Size Range by a Single-Step Process", Br. Polym. J. Dec. 131 (1982).

*Primary Examiner*—Fred Teskin
*Attorney, Agent, or Firm*—John E. Taylor, III

[57] ABSTRACT

Uniformly sized polymer particles of 1–50 μm diameter are made by gradually combining a water-insoluble monomer mixture with an aqueous dispersion of emulsion-polymerized polymer particles in the presence of a dispersion stabilizer and an oil-soluble, free-radical polymerization initiator.

22 Claims, No Drawings

PROCESS FOR MAKING CONTROLLED, UNIFORM-SIZED PARTICLES IN THE 1 TO 50 MICROMETER RANGE

This is a continuation-in-part of U.S. patent application Ser. No. 497,377 filed Mar. 22, 1990, now abandoned. This invention relates to a polymerization process, and more particularly to a process for polymerizing water-insoluble monomers in the presence of preformed, uniformly sized polymer particles.

BACKGROUND OF THE INVENTION

Small polymer particles, in the range of 1 to 50 micrometers ($\mu$m), have many applications, including light scattering and diffusion, surface coating, intermediates for preparation of chromatographic solid phases, adsorbents, ionexchange materials, and the like. For many such applications, particularly optical and chromatographic ones, uniformity of the particle size is critical to performance. Emulsion polymerization can produce particles up to about 0.5-1.0 $\mu$m having a relatively narrow size distribution, but the size is limited by the nature of an emulsion. In such a polymerization the monomers are emulsified in water using a soap, and the polymerization is initiated by a watersoluble, free-radical initiator. The particle size depends more on the composition of the polymerization mixture, i.e., the soap, the stabilizers used and the monomers themselves than on the specific physical conditions of the polymerization.

Suspension polymerization can produce particles from about 50 $\mu$m to about 2 mm. The monomer is suspended as droplets in water, and polymerization is initiated by an oil-soluble initiator which partitions into the monomer droplets. Particle size depends on the size of the monomer droplets, which is affected primarily by the stirring rate, the amount of suspension stabilizers, and similar physical conditions for the polymerization. As a result of the inherent variability of these conditions, particle size distribution tends to be broad. Smaller particles, as small as 10 $\mu$m, have been reportedly produced by high-shear suspension polymerization, but the size distribution is even broader.

Grinding of polymers that have been made by other processes which produce larger sized polymers, such as bulk polymerization, can lead to particles in the desired size range. Unfortunately, grinding not only results in large size distribution, but causes thermal degradation of heat-sensitive polymers. Thus direct production of particles larger than 1 $\mu$m but smaller than 50 $\mu$m is difficult.

Multiple-step processes have been used to produce particles within the range of 1-50 $\mu$m. In these processes a pre-formed emulsion polymer, or "seed", is used as a starting material. The polymer is swollen, either in an organic solvent or in a monomer which behaves as a swelling solvent for the polymer, and monomer is imbibed into the swollen structure of the polymer and polymerized there, thus increasing the size of, or "growing", the particle. This swelling, imbibing and polymerizing process may be repeated to further increase the size of the particle. Because the emulsion polymerization that forms the seed inherently produces a relatively narrow size distribution, the multiple-step processes have the potential for producing larger particles with similarly narrow size distributions. Not all multiple-step processes live up to this potential, and the swelling and imbibing steps are inherently slow; the reactions may take days. In addition, those processes which involve swelling solvents introduce the economic and environmental problems of solvent recovery and disposal. Special low-shear agitation or highly dilute dispersions may also be required to prevent the particles from coalescing during growth.

Thus it is an object of the present invention to provide a rapid, solvent-free process by which polymer particles in the size range of 1-50 $\mu$m and having a narrow size distribution may be made. Other objects of the invention will be apparent from the following description.

SUMMARY OF THE INVENTION

We have discovered a process for making uniformly sized polymer particles having a selected final particle size within the range of 1-50 $\mu$m which comprises the steps of a) combining a free-radical-polymerizable, water-insoluble monomer or mixture of such monomers with an aqueous dispersion of seed polymer particles, at a rate such that an amount of monomer or mixture of monomers equal to the total initial weight of the seed polymer particles is combined with the dispersion over a period of from about 45 to about 120 minutes, in the presence of a dispersion stabilizer, an oil-soluble, free-radical polymerization initiator and from about 0 to about 50% of a porogen, the percentage being based upon the weight of monomers plus porogen, at a temperature at least as high as that at which the initiator is activated, until sufficient monomer or mixture of monomers has been combined to grow the particles to a selected intermediate size, b) maintaining the temperature of the combined monomer and particles at least as high as that at which the initiator is activated, until sufficient monomer or mixture of monomers has been combined to grow the particles to a selected size, and c) continuing to maintain the temperature of the combined monomer and particles at least as high as that at which the initiator is activated until all the monomer is polymerized, these steps being repeated until the selected intermediate size is equal to the selected final particle size.

DETAILED DESCRIPTION OF THE INVENTION

In the process of the present invention the emulsion-polymerized particles act as seed particles; these are swollen by the monomer, which is polymerized to become part of the seed particles and permanently increase their size. Because the seed particles have a uniform size, and the conditions affecting uptake of monomer by the particles are relatively uniform throughout the reaction mixture, the size of the product particles depends primarily upon the amount of monomer combined with the seed particle dispersion. The stabilizing agent inhibits coalescence of particles in the dispersion, thus helping preserve particle-size uniformity. The use of an oil-soluble (water-insoluble) initiator helps inhibit formation of new emulsion particles and promotes the growth of the seed particles, because it partitions into the monomer-polymer phase found in the particles and thus tends to be unavailable to monomer in the aqueous phase.

Yet another important factor in avoiding new emulsion particles, and in preventing agglomeration of existing particles is the rate at which monomer is combined with the particles. In a preferred embodiment of the invention, wherein monomer is fed to the dispersion of particles, the feed rate is such that at least 45 minutes is required to add a weight of monomer equal to the initial weight of the seed particles, and preferably such that the free monomer in the dispersion is no more than about 10% of the particle weight at any time during the process.

The emulsion-polymer seed particles useful in the process of the present invention may be prepared by emulsion polymerization processes known to those skilled in the art. Such processes inherently produce particles of relatively narrow particle-size distribution; one skilled in the art will understand how to vary the emulsion polymerization conditions to produce particles having a mean particle diameter within the range of about 0.01 to about 2 μm. Seed particles within this size range, and more preferably in the range of about 0.05 to about 0.5 μm, may be used in the present process The seed particles may be crosslinked or uncrosslinked. The monomers from which they may be prepared include vinylaliphatic monomers such as esters of acrylic and methacrylic acids, acrylonitrile and the like, olefins such as ethylene and propylene, and aliphatic monomers with conjugated unsaturation such as butadiene. They may also be prepared from vinylaromatic monomers such as styrene, substituted styrenes and the like. The seed particles may be crosslinked by the formation of secondary crosslinks within the polymer structure, by the inclusion of a polyethylenically unsaturated monomer or monomers among the monomers from which the seed particles are formed, or by any other crosslinking processes known to those skilled in the art. Preferred seed particles are crosslinked copolymers of styrene with divinylbenzene.

The suspending agent for the process of the present invention is water. The stabilizing agents useful for the process are preferably anionic surfactants, as for example alkyl, aryl or alkaryl sulfates, sulfonates, phosphates or succinates, and their ethoxylated derivatives, nonionic surfactants, as for example polyoxyethylene alkyl ethers, polyoxyethylene alkyl phenol ethers, or polyethylene glycols, or mixtures of anionic and nonionic surfactants. Watersoluble polymers such as polyvinyl alcohol, polyvinylpyrrolidone, carboxyalkyl celluloses and hydroxyalkyl celluloses may also be incorporated into the polymerization mixture for additional stabilization of the latex particles.

The initiator useful for the process of the present invention is an oil-soluble, free-radical initiator, and preferably has a one-hour half-life temperature of 60°-100° C. The one-hour half-life temperature is readily understood by those skilled in the art as that temperature at which one half of the initiator present at any given time will have decomposed, forming free radicals, within one hour. The preferred initiators are peroxides such as t-butyl peroctoate and benzoyl peroxide, and azo initiators such as 2.2'-azobis(2-methylbutane nitrile) and 2,2'-azobis(2,4-dimethylpentane nitrile). The preferred initiator concentration is from about 0.5% to about 2% by weight of the total monomer. The temperature of the polymerization is at least the activation temperature of the initiator selected, and is preferably from about 50° to about 90° C. The activation temperature of the initiator is readily understood by one skilled in the art to be the lowest temperature at which the initiator begins to decompose and generate a significant concentration of free radicals. The preferred reaction pressure is atmospheric but the reaction will proceed at pressures above and below atmospheric where some other advantage justifies the additionally complex equipment that non-atmospheric polymerization requires.

The monomers useful in the present invention are any water-insoluble, free-radical-polymerizable monomers or mixtures of such monomers. Preferred are vinylaromatic monomers and particularly preferred is styrene. The monomer or mixture of monomers may include crosslinking monomers, that is, monomers containing more than one polymerizable functional group, as for example divinylbenzene, and graftlinking monomers, that is, those monomers containing more than one polymerizable functional group in which the polymerizable functional groups polymerize at significantly different rates, as for example allyl methacrylate.

The polymer particles of the present invention may be made in either a microporous or a macroporous form. The microporous particles, often referred to as "gel" particles, contain only the intermolecular porosity of the polymer itself, with pore diameters in the range of from about 0.1 to about 5 nm, while the macroporous particles contain an additional porosity which is independent of the intermolecular porosity, with pore diameters beginning at about 5 nm and ranging upwards to as large as about 10 μm in large polymer particles, and proportionally smaller in smaller particles, e.g., particles of 10 μm may have pores with diameters as large as about 1 μm. When a porogen is absent from the monomer or mixture of monomers added to the seed particles, the resulting polymer particles will be merely microporous, but when a porogen is included, the particles will be macroporous. Polymerization in the presence of a porogen to produce macroporous polymers is described in U.S. Pat. No. 4,382,124; the porogens are referred to therein as "polymer precipitants" or merely "precipitants". The porogen is characterized by being a solvent for the monomer mixture being copolymerized while exerting essentially no solvent action on the copolymer. Introduction of the porogen to the monomer phase decreases the solubility in the monomer phase of any copolymer formed, causing the polymer to separate from the monomer phase as it is formed, a phenomenon known as "phase separation". As the concentration of monomer in the polymerizing mass decreases because of polymerization, and as the concentration of resulting copolymer increases, the porogen is more strongly repelled by the copolymer mass and is actually squeezed out of the copolymer phase leaving a series of interconnecting pores that are large relative to the intermolecular micropores. Suitable porogens for the process of the present invention include $C_4$–$C_{10}$ alkanols including butanol, linear and branched pentanols, hexanols, heptanols, octanols, nonanols and decanols, as for example 4-methylpentan-2-ol (methyl isobutyl carbinol); $C_7$–$C_{20}$ saturated aliphatic hydrocarbons; alkyl esters of seven or more carbon atoms, such as n-hexyl acetate, 2-ethylhexyl acetate, methyl oleate, dibutyl sebacate, dibutyl adipate and dibutyl carbonate; aliphatic ketones such as methylisobutylketone, diisobutylketone; and aromatic hydrocarbons such as toluene and ortho and para xylenes. The specific kind and percentage of porogen in the monomer mixture is selected according to the degree of macroporosity desired and the particular monomers. U.S. Pat. No. 4,382,124, mentioned above, may serve as a guide to this selection.

The size to which the polymer particles are grown according to the present invention is determined by the amount of monomer or monomer mixture used. In general, monomer may be combined with the polymer particles until they have grown to about 10 times their initial volume, and more preferably about 7 times their original volume, although it is clear that using less monomer will result in a smaller product, and the desired particle size may be selected by one skilled in the art to be suitable for the particular use contemplated for the final particle. The selected particle size is preferably within the range of from about 1.1 to about 10 times the initial particle volume, more preferably from about 1.5 to about 7 times the initial particle volume, and still more preferably from about 2 to about 5 times the initial particle volume. It is clear from simple geometry that a change in volume produces a diameter change that is the cube root of the volume change, i.e., a 5X volume change is a $\sqrt[3]{5}$X diameter change, or a 1.71X diameter change.

The above discussion of the size to which the particles may be grown refers to a single application of the present process. Particles much larger than the 10-fold volume increase may be obtained by repeating this process using as seed particles the product particles from this process. By such repetition particles may be grown that are significantly larger than those obtainable from a single growth step. Seed particles in the preferred diameter range of about 0.05 to about 0.5 $\mu$m may thus be grown to any diameter within the range of 1 to 50 $\mu$m by from one to ten or more repetitions of this process.

In combining the monomer and the suspension of seed polymer particles, it is clear that the monomer may be added to the suspension, the suspension may be added to the monomer, or both may be added simultaneously to one another in a separate vessel. Addition of the monomer to the suspension is preferred, and will be used in the following illustrations.

The feed rate for the monomer is such that an amount of monomer equal to the weight of the total original seed particles is combined with the suspension of polymer particles over a period of from about 45 to about 120 minutes, and more preferably from about 60 to about 90 minutes, until the seed particles have grown to the selected size. That is, the feed rate is maintained within this range, and the length of time for the addition is selected so that the desired particle growth occurs.

For example, if a feed rate is selected such that an amount of monomer equal to the weight of the total original seed particles is combined with the suspension of polymer particles over a period of 60 minutes, and a particle volume increase of 5 times is desired, the monomer is fed to the suspension over a 5-hour period. Essentially all of the monomer is polymerized into the existing particles, and as no significant change in particle density occurs, the volume of each particle increases 5-fold.

More preferably the monomer or mixture of monomers may be added to the suspension of seed polymer particles at a controlled rate such that the free monomer in the reaction mixture does not exceed about 10%, by weight, of the instantaneous polymer-particle weight. The instantaneous polymer-particle weight is the total polymerized weight of the particles at any time during the reaction, and includes the polymer mass added to the original seed particles during the polymerization of the present process. The free monomer is that monomer that has been combined with the polymer particles but has not yet reacted at a given time during the process. If the levels of free monomer exceed about 10%, the polymer particles may coagulate, which will undesirably increase the particle size and size distribution. Levels of free monomer above 10% may also lead to formation of an additional population of emulsion-sized particles, which will again contribute to an undesirably broad particle-size distribution.

A particularly advantageous feature of the present invention is that it eliminates the need to swell the seed polymer prior to addition of the monomer solution. No lengthy soaking in an organic solvent is required; the gradual addition of the monomer-initiator solution may, for example, be begun immediately after charging an aqueous suspension of the seed particles to a reaction vessel.

The following examples are intended to illustrate the invention. All percentages and proportions are by weight unless otherwise specified, and all reagents are of good commercial quality unless otherwise specified.

EXAMPLE 1

This example illustrates the growth of a polystyrene seed latex having a particle size 3.3 $\mu$m into uniformly sized polymer particles of 5-$\mu$m diameter with a styrene-3.8% divinylbenzene monomer mixture using the procedure of the present invention.

To a 5-liter, round-bottomed kettle equipped with a condenser, agitator, heating source, inert-gas inlet, temperature sensor and pump-driven feed lines was charged 1860 g deionized water and 20 g of a 30% aqueous solution of sulfated polyethoxynonylphenol, ammonium salt as a surfactant. The mixture was heated under nitrogen to 85° C. with agitation. 678 g of a polystyrene seed latex having a particle size of 3.3 $\mu$m and a solids content of 35.4% was rinsed into the kettle with 100 g additional deionized water, and the mixture was reheated to 85° C. A monomer emulsion of 320 g deionized water, 12 g of a 30% aqueous solution of sulfated polyethoxynonylphenol, ammonium salt as a surfactant, 893.5 g styrene, 66.5 g commercial divinylbenzene (55% purity, the balance being largely ethylvinylbenzene) and 9.6 g benzoyl peroxide initiator was prepared and fed into the kettle at a constant rate such that the entire emulsion was transferred to the kettle in 4 hours, a chaser of 1 g benzoyl peroxide initiator dissolved in 5 g styrene being added to the emulsion container after 3.5 hours. The emulsion container was then rinsed into the kettle with 100 g additional deionized water. At the end of the 4-hour emulsion feed, the kettle contents were held at 85° C. for one hour, then cooled and filtered through a 45-$\mu$m sieve. The solids content of the resulting polymer suspension was 29.4%. The size of the particles was determined by optical microscopy to be 5.6 $\mu$m (94% of the particles), with approximately 6% of the particles significantly exceeding this size because of the coalescence of two or three particles.

EXAMPLE 2

The following example is intended to illustrate the growth of an uncrosslinked polystyrene seed latex from a particle size of 4.9 $\mu$m to 8.4 $\mu$m using the procedure of the present invention.

Following the procedure of Example 1, 419 g deionized water and 6.4 g of a 30% aqueous solution of sulfated polyethoxynonylphenol, ammonium salt, surfactant was charged to the kettle. The kettle contents were heated to 85° C., and 206.9 g of a polystyrene seed latex having a particle size of 4.9 μm and a solids content of 28% was rinsed into the kettle with 30 g of deionized water. A monomer emulsion of 80 g deionized water, 1.6 g of the above surfactant solution, 240 g styrene and 2.4 g benzoyl peroxide was prepared and fed into the kettle at a constant rate over a period of 4 hours. The emulsion container was then rinsed into the kettle with 30 g of additional deionized water. The mixture was held at 85° C. for one hour, cooled and filtered. The resulting latex had a solids content of 28.9% and a particle size of 8.4 μm, with approximately 4% of the particles significantly exceeding this size because of the coalescence of two or three particles.

EXAMPLE 3

This example is intended to illustrate the growth of a lightly crosslinked (0.1% divinylbenzene) seed from a particle size of 8.4 μm to 14.2 μm with a styrene-0.1% divinylbenzene monomer mixture using the procedure of the present invention.

Using the procedure of Example 1 above, a kettle charge of 530 g deionized water, 94 g of a 10% aqueous solution of ammonium octylphenoxyethoxyethyl phosphate surfactant, 13.5 g of a 70% aqueous solution of octylphenoxypolyethoxyethanol nonionic surfactant, and 58.7 g of a 2% aqueous solution of methylhydroxypropyl cellulose was prepared. To this mixture was added 312.5 g of a 99.9 styrene/0.1 divinylbenzene seed latex having a particle size of 8.4 μm and a solids content of 25.6%, with a 30-g deionized water rinse. The mixture was heated to 85° C. with agitation under a nitrogen atmosphere, and a monomer emulsion of 152.8 g deionized water, 3.1 g of the above nonionic surfactant, 21.6 g of the above phosphate surfactant, 14 g of 2% aqueous solution of methylhydroxypropyl cellulose, 319.4 g styrene, 0.6 g divinylbenzene and 3.2 g benzoyl peroxide was fed to the kettle at a constant rate over 4 hours. The monomer emulsion container was rinsed into the kettle with 30 g of deionized water and the batch was held at 85° C. for one hour, cooled and filtered. The resulting latex had a solids content of 26.7% and a particle size of 14.2 μm, with approximately 8% of the particles significantly exceeding this size because of the coalescence of two or three particles.

EXAMPLE 4

This example is intended to illustrate growth of a butyl methacrylate seed latex from a particle size of 1.7 μm to 2.9 μm with methyl methacrylate monomer using the procedure of the present invention.

Using the procedure of Example 1 above, the kettle was charged with 403.5 g deionized water, and 222.2 g of a poly(butyl methacrylate) seed latex having a particle size of 1.7 μm and a solids content of 27% was added to the kettle with a rinse of 30 g deionized water. The mixture was heated to 85° C. with agitation under a nitrogen atmosphere, and a monomer emulsion of 80 g deionized water, 1.6 g of a 30% aqueous solution of ammonium sulfated polyethoxynonylphenol surfactant, 240 g methyl methacrylate and 2.4 g benzoyl peroxide was added at a constant rate over a period of 6 hours, then rinsed into the kettle with 30 g deionized water. The mixture was held at 85° C. for 45 minutes, then cooled and filtered. The resulting latex had a solids content of 29.2% and a particle size of 2.9 μm, with about 3% of the particles significantly exceeding this size because of the coalescence of two or three particles.

EXAMPLE 5

This example is intended to illustrate the growth of a mixed butyl methacrylate-styrene seed latex from a particle size of 3.4 μm to 5.4 μm with mixed butyl methacrylate and styrene monomers using the procedure of the present invention.

Using the procedure of Example 1 above, the kettle was charged with 412 g deionized water, 1 g aqueous ammonia and 4.2 g of 0.15% aqueous magnesium p-nitrosophenoxide retarder. To this mixture was added 208.3 g of a 65 butyl methacrylate/35 styrene seed latex having a particle size of 3.4 μm and a solids content of 28.8%, with a rinse of 30 g deionized water. The mixture was heated to 85° C. with agitation under a nitrogen atmosphere, and a monomer emulsion of 80 g deionized water, 2.4 g of a 30% aqueous solution of sulfated polyethoxynonylphenol, ammonium salt, surfactant, 156 g butyl methacrylate, 84 g styrene and 2.4 g t-butyl peroctoate initiator was added at a constant rate over a period of 4.5 hours, then rinsed into the kettle with 30 g deionized water. The mixture was held at 85° C. for one hour, then cooled and filtered. The resulting latex had a solids content of 28.6% and a particle size of 5.4 μm.

EXAMPLE 6

This example is intended to illustrate the growth of a more highly crosslinked (10% divinylbenzene) seed from a particle size of 3.3 μm to 4.6 μm with a styrene-10% divinylbenzene monomer mixture using the procedure of the present invention.

Using the procedure of Example 1 above, the kettle was charged with 442 g deionized water and 12.8 g of a 30% aqueous solution of sulfated polyethoxynonylphenol, ammonium salt, surfactant. To this mixture was added 172.4 g of a polystyrene seed latex having a particle size of 3.3 μm and a solids content of 34.8%, with a rinse of 30 g deionized water. The mixture was heated to 85° C. with agitation under a nitrogen atmosphere, and a monomer emulsion of 80 g deionized water, 3.2 g of the above surfactant, 196.4 g styrene 43.6 g divinylbenzene and 2.4 g benzoyl peroxide initiator was added at a constant rate over a period of 5 hours, then rinsed into the kettle with 30 g deionized water. The mixture was held at 85° C. for two hours, then cooled to 55° C., and a chaser of 2.4 g of a 0.15% aqueous solution of ferrous sulfate, 0.19 g sodium sulfoxylate formaldehyde in 10 g water and 0.41 g of a 70% aqueous solution of t-butyl hydroperoxide was added. The mixture was then held at 55° C. for 30 minutes, cooled and filtered. The resulting latex had a solids content of 30.9% and a particle size of 4.7 μm with about 0.5% of the particles significantly exceeding this size because of the coalescence of two or three particles.

EXAMPLE 7

This example is intended to illustrate growth of a lightly crosslinked seed from a particle size of 5.3 μm to a macroporous bead of 8.9 μm using divinylbenzene monomer in the presence of a porogen.

A 3-liter, 4-neck, round-bottom reaction flask was blanketed with nitrogen gas and charged with 4.4 g carboxymethyl methyl cellulose (molecular weight approximately 2000) and 1000 g deionized water. The reaction-flask contents were swept with nitrogen continuously, and heated to 60° C.

To 60 g of a separately prepared, surfactant solution containing 660 g deionized water, 55 g of an 80% aqueous solution of alkylaryl polyether phosphate ester in the acid form (sold as Triton QS-44 surfactant) and 15.82 g aqueous 50% sodium hydroxide solution was added 15 g of seed particles prepared according to Example 1 and having a divinylbenzene content of 0.1% and a mean particle diameter of 5.3 μm. This mixture was mixed thoroughly and added to the contents of the reaction flask along with a rinse of 400 g deionized water.

To the remaining, separately prepared, surfactant solution was added a solution of 2.25 g aqueous 0.4% magnesium p-nitrosophenolate solution and 0.18 g aqueous 50% NaOH solution. An organic solution was separately prepared by mixing 31.5 g purified divinylbenzene (containing 80% divinylbenzene and 20% other monomers, primarily ethylvinylbenzene), 73.5 g toluene and 0.0315 g t-butyl peroctoate and sparging the mixture for 30 minutes with nitrogen gas. A 10-g portion of the organic solution was mixed with 0.1575 g t-butyl peroctoate, and 65 g of the surfactant solution was stirred vigorously into the mixture and emulsified by vigorous blending.

The remaining surfactant solution was mixed with the remaining organic solution, and the mixture was emulsified by vigorous blending. This emulsion was introduced below the surface of the liquid in the reaction flask over a period of 4 hours. The contents of the reaction flask were stirred slowly throughout this and following steps until they were cooled. At the end of the addition, the above emulsion of 10 g organic solution and 65 g surfactant solution was added to the reaction flask, with stirring, over a period of 15 minutes. The temperature of the reaction-flask contents was maintained at approximately 60° C. throughout the entire addition and for two hours longer, after which it was increased to 72° C. and held at that temperature for approximately 16 hours. The mixture was then heated to 95° C., held at that temperature for one hour, cooled to ambient temperature, filtered and washed repeatedly with methanol, the methanol being removed by vacuum.

The resulting copolymer particles were observed to be porous upon photomicrographic examination, and they had a mean diameter of 8.9 μm.

EXAMPLE 8

This example is intended to illustrate growth of a lightly crosslinked seed from a particle size of 5.3 μm to a macroporous bead of 8.4 μm using divinylbenzene monomer in the presence of a different porogen.

The procedure and seed beads of Example 7 were used. The deionized water charged to the reaction flask was 1400 g, and in place of the toluene in the organic solution was 46.5 g o-xylene. The resulting beads were found to be porous upon photomicrographic examination, and had a diameter of 8.4 μm.

EXAMPLE 9

This example is intended to illustrate growth of an uncrosslinked seed from a particle size of 5.3 μm to a macroporous bead of 8.7 μm using divinylbenzene monomer in the presence of yet another porogen.

The procedure of Example 7 was used, except that the temperature was maintained at 70° C. throughout the entire monomer addition. The seed used was an uncrosslinked polystyrene homopolymer with a particle diameter of 5.3 μm. The initial charge to the reaction flask was 450 g deionized water and 0.71 g carboxymethyl methyl cellulose.

The surfactant solution was 200 g deionized water, 16.3 g of the 80% aqueous solution of alkylaryl polyether phosphate ester, acid form, and 4.7 g aqueous 50% sodium hydroxide solution; this solution was divided in the same weight proportions as in Example 7. The seed charge was 33.3 g of a 30% aqueous suspension of the seed particles. To the remaining portion of the surfactant solution was added 2.0 g of the aqueous 0.4% magnesium p-nitrosophenolate solution and 0.2 g aqueous 50% sodium hydroxide solution. The organic solution was 25 g purified divinylbenzene (80% divinylbenzene), 30.0 g methyl isobutyl carbinol and 0.15 g t-butyl peroctoate.

At the end of the monomer feed, the temperature was held at 70° C. for one hour, then heated to 76° C. and held there for 16 hours, and finally heated to 85° C. and held there for two hours. The finished polymer beads, isolated as described in Example 7, were observed to be porous upon photomicrographic examination, and had a diameter of 8.7 μm.

What is claimed is:

1. A process for making uniformly sized polymer particles having a selected final particle size within the range of 1–50 μm which comprises the steps of
    a) combining a free-radical-polymerizable, water-insoluble monomer or mixture of such monomers with an aqueous dispersion of seed polymer particles, at a rate such that an amount of monomer or mixture of monomers equal to the total initial weight of the seed polymer particles is combined with the dispersion over a period of from about 45 to about 120 minutes, in the presence of a dispersion stabilizer and an oil-soluble, free-radical polymerization initiator at a temperature at least as high as that at which the initiator is activated, until sufficient monomer or mixture of monomers has been combined to grow the particles to a selected intermediate size,
    b) maintaining the temperature of the combined monomer and particles at least as high as that at which the initiator is activated, until sufficient monomer or mixture of monomers has been combined to grow the particles to a selected size, and
    c) continuing to maintain the temperature of the combined monomer and particles at least as high as that at which the initiator is activated until all the monomer is polymerized, these steps being repeated until the selected intermediate size is equal to the selected final particle size.

2. The process of claim 1 wherein the rate at which the monomer or mixture of monomers and the dispersion are combined is such that the amount of monomer or mixture of monomers equal to the total initial weight of the seed polymer particles is combined with the dispersion over a period of from about 60 to about 90 minutes.

3. The process of claim 1 wherein the rate of addition of the monomer or mixture of monomers is such that the free monomer or mixture of monomers present does not exceed about 10%, by weight, of the instantaneous polymerparticle weight.

4. The process of claim 1 wherein the selected intermediate size is from about 1.1 to about 10 times the initial volume of the seed polymer particle.

5. The process of claim 1 wherein the selected intermediate size is from about 1.5 to about 7 times the initial volume of the seed polymer particle.

6. The process of claim 1 wherein the selected intermediate size is from about 2 to about 5 times the initial volume of the seed polymer particle.

7. The process of claim 1 wherein the seed polymer particles are emulsionpolymerized particles having an initial diameter of from about 0.01 to about 2 μm.

8. The process of claim 1 wherein the seed polymer particles are emulsionpolymerized particles having an initial diameter of from about 0.05 to about 0.5 μm.

9. The process of claim 1 wherein the seed polymer particles are particles produced by applying steps a) through c) to emulsion-polymerized particles one or more times.

10. The process of claim 1 wherein the stabilizing agent is selected from anionic surfactants and nonionic surfactants.

11. The process of claim 10 wherein the stabilizing agent additionally includes a water-soluble polymer.

12. The process of claim 1 wherein the initiator has a one-hour half-life temperature of from about 60° to about 100° C.

13. The process of claim 12 wherein the initiator is a peroxide initiator.

14. The process of claim 12 wherein the initiator is an azo initiator.

15. The process of claim 13 wherein the initiator is benzoyl peroxide.

16. The process of claim 1 wherein the monomer or mixture of monomers is one or more vinylaromatic monomers.

17. The process of claim 16 wherein the monomer is styrene.

18. The process of claim 16 wherein the monomer or mixture of monomers includes a crosslinking monomer.

19. The process of claim 1 wherein the monomer or mixture of monomers is combined with the polymer particles in the presence of a porogen.

20. The process of claim 19 wherein the porogen is toluene.

21. The process of claim 19 wherein the porogen is xylene.

22. The process of claim 19 wherein the porogen is methyl isobutyl carbinol.

* * * * *